July 25, 1961 E. KARIG ET AL 2,993,385
CONTROL DEVICE FOR INFINITELY VARIABLE GEARS
Filed July 9, 1959 3 Sheets-Sheet 1

INVENTORS
Erhardt Karig
Rudolf Schrodt
BY
Bailey, Stephens + Huettig
Attorneys

July 25, 1961

E. KARIG ET AL 2,993,385

CONTROL DEVICE FOR INFINITELY VARIABLE GEARS

Filed July 9, 1959

INVENTORS
Erhardt Karig
Rudolf Schrodt
BY
Bailey, Stephens + Huettig
Attorneys

United States Patent Office 2,993,385
Patented July 25, 1961

2,993,385
CONTROL DEVICE FOR INFINITELY VARIABLE GEARS
Erhardt Karig, Bad Homburg vor der Hohe, and Rudolf Schrodt, Kronberg, Taunus, Germany, assignors to Reimers-Getriebe KG, Ascona, Switzerland
Filed July 9, 1959, Ser. No. 826,087
Claims priority, application Germany July 19, 1958
5 Claims. (Cl. 74—230.17)

The invention relates to a control device for infinitely variable transmissions having transmission means running between pulleys having axially displaceable conical parts, wherein the control forces, which are necessary for the maintenance and arbitrary variation of the transmission ratio, and which are applied, in the form of axial force, to at least one axially displaceable conical pulley part in the pair on the driving side, are dependent on the load on the gear.

In order that the transmission means running between the pairs of conical pulley parts may be able to transmit the necessary frictional force under any load and at any gear ratio, one of the conical pulley parts in a pair, for example on the driven side, is fixed in the axial direction in a manner which is known in such transmissions, while the second conical pulley part in a pair is urged in the axial direction, by means of a pressure-applying mechanism, towards the transmission means, with an axial force which may be dependent not only on the torque on the driven shaft but also on the particular gear ratio. As a result, forces which are directed radially outwards are exerted on the transmission means running through the driven pair of pulley parts, in consequence of which the transmission means on the driving side (power input side) tends to penetrate more deeply between the conical pulley parts and so produces expansion forces which tend to increase the axial distance between the conical pulley parts in the pair of driving pulley parts. In order that no unwanted variation in the transmission ratio may occur, axial pressure forces, which counteract the expansion forces, have to be applied at the driving side of the transmission to prevent a variation in the radius of travel of the transmission means.

In transmissions of medium power, the pressure forces on the driven side of the transmission, which are dependent on the load and transmission ratio, reach the order of magnitude of a few thousand kilograms, and the axial pressure forces counteracting the expansion forces on the driving side are of the same order of magnitude. On the driven side, these high axial forces arise inside the rotating set of pulley parts and therefore do not have to be taken up from the housing by means of a ball bearing or the like. On the driving side, on the other hand, the pressure forces counteracting the expansion forces have to be transmitted to the rotating set of pulley parts from the outside, by means of a control lever or the like, in order to maintain a transmission ratio which has once been set, so that the interposition of a very heavily loaded thrust ball bearing is necessary. It is true that a pressure-applying device, which delivers axial forces dependent on the torque on the driving shaft and on the transmission ratio, and arising inside the rotating set of pulley parts, may also be provided on the driving side. Nevertheless, the expansion forces arising on the driving side should not be completely balanced out by such a pressure-applying device because a positive control force is still necessary on the driving side for the steady operation of the transmission. This applies even when other known pressure-applying devices are used on the driving and/or driven side to supply pressure forces dependent on the load on the transmission. For example, it is known to produce the axial pressure forces necessary to transmit the frictional force by hydraulic means on the driving and driven sides. In this case, the movable conical pulley parts in the two sets of pulley parts are constructed in the form of axially movable power pistons on which acts a pressure fluid, the pressure of which is controlled, depending on the load on the transmission, by means of by-pass valves in the pressure line from the pump producing the hydraulic pressure.

The additional axially directed control force which has to be applied on the driving side in order to maintain and voluntarily vary the transmission ratio even when such a hydraulic pressure-applying device is used, as in other cases, has to be transmitted to the rotating set of pulley parts from a stationary member through a thrust ball bearing in the known types of transmission, as already explained, and naturally also has to be taken up from the housing through a ball bearing or the like.

Now it has been found that, in transmissions having a very high specific power, these bearings which take up the control forces are so heavily loaded that their life is insufficient. In addition, it has been found that the mechanical members necessary to support the control forces have so much flexibility that the transmission is subjected to an unwanted variation in transmission ratio on variations in the load.

It is the object of the present invention to relieve the bearings in the set of driving pulley parts to a large extent from taking up the axial control forces and to construct the control device for the maintanance of and voluntary variation in the transmission ratio so rigidly that no appreciable unwanted variations in the transmission ratio occur, even with considerable variations in the load on the transmission.

According to the invention, this is achieved as a result of the fact that the movable conical pulley part in the pair of conical pulley parts on the driving side concerned is constructed, in a manner known per se, in the form of a piston which is displaceable axially in a cylinder which rotates with the driving shaft of the transmission (power piston), which piston is subject to the action of a pressure fluid, the pressure of which is controlled by means of an adjustable control valve which is mounted in the pressure line of a pump producing the hydraulic pressure, and that the pressure-relief valve determining the hydraulic pressure acting on the piston is adjustable not only in dependence on the axial displacement of one of the movable conical pulley parts but also in dependence on the setting of an actuating member for producing a variation in transmission ratio. The introduction of the pressure fluid into the rotating cylinder in which the piston is axially displaceable causes no, or only very minor, axial forces acting on the particular set of driving pulley parts and these forces can easily be taken up by the ordinary shaft bearings.

The control valve may be constructed in such a manner that, even in the event of extremely small displacements of the axially movable conical pulley part, it causes such a great variation in the pressure of the pressure fluid that the variations in the transmission ratio which occur with variations in load remain negligible. For this purpose it has proved convenient to constitute the pressure-relief valve by at least one control piston which is displaceable in a control cylinder and which, on axial displacement, determines, with a controlling edge, the cross-sectional area of the passage through an overflow aperture in the control cylinder which is constantly supplied with pressure fluid by the delivery pump. In order to maintain a transmission ratio which has once been set, and in order to vary this transmission ratio voluntarily, the control piston is pivotally linked, according to the invention, to a double-armed lever, one end of which is connected to the axially displaceable conical pulley part and the other end of which is connected to a part of the actuating member for producing the variation in the transmission ratio, the position of this being adjustable at will.

In a further development of the idea of the invention, the control device described provides a particularly simple and suitable solution to the problem of connecting in parallel a plurality of similar transmissions of the aforesaid type, the driving and driven shafts of each of which are joined together in rotation to form a line of shafts rotating at the same speed, in which case the requirement that the total load should be evenly distributed over the transmissions connected in parallel can be met in a particularly simple manner. For this purpose, according to the invention, only one of the transmissions connected in parallel comprises the control valve, which has already been described and which controls the hydraulic pressure, and the actuating member for producing a voluntary variation in all the transmission ratios in the same sense, but the movable conical pulley parts which are constructed in the form of power pistons on the driving side of each of the transmissions connected in parallel, and which are adapted for displacement in the cylinders of the individual transmissions rotating with the line of driving shafts, are jointly subjected to the hydraulic pressure controlled by the control valve. The pressure fluid is conveyed to the rotating cylinders of the transmissions connected in parallel through an axial bore in the line of shafting formed from the driving shafts of the individual transmissions and through radial bores leading from this axial bore. As a result, all the pistons in the transmissions connected in parallel are subjected to the same pressure and, accordingly, all the transmissions must run at precisely the same ratio and so all transmit the same proportion of the load. If one of the transmissions connected in parallel were to transmit a higher proportion of the load than the other transmissions, then the expansion force, which would likewise be increased as a result of this increased load, on the driving side of this individual transmission, would not be counteracted by a correspondingly high axial force produced by the oil pressure and this individual transmission would accordingly vary its transmission ratio until equilibrium was reached between the expansion force and the force of the oil-pressure. Since, however, the force of the oil pressure is equal in all the transmissions, the counteracting expansion forces in the individual transmissions must also be equal to one another, from which the uniform distribution of the load over all the transmissions results. From the fact that in all the transmissions the axial control forces for maintaining a transmission ratio which has once been set are always positive, it follows directly that any disturbance of the equilibrium in the load distribution is balanced out in the sense of restoring this equilibrium and so the transmissions connected in parallel retain a stable position of equilibrium as regards the uniform load distribution.

Embodiments of the subject of the invention are illustrated diagrammatically and by way of example in the drawing.

Figure 1:
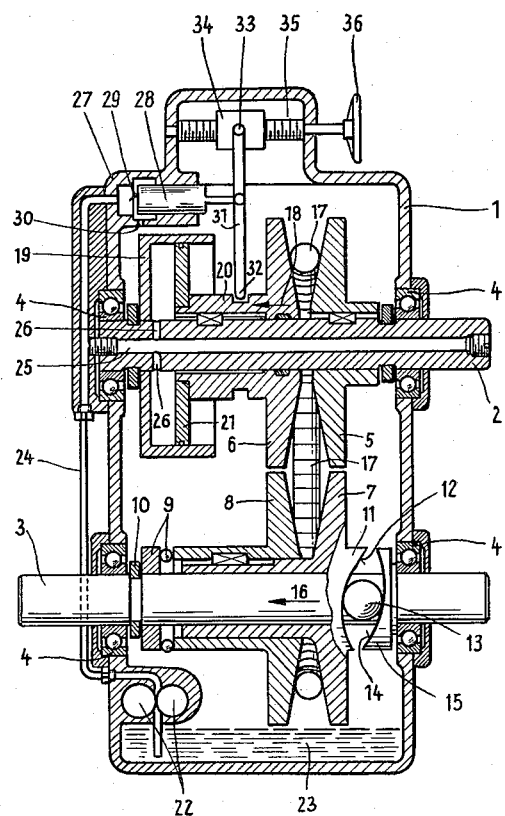
FIGURE 1 shows a diagrammatic longitudinal section through an infinitely variable transmission having a control device according to the invention.

In the gear shown in FIGURE 1, a driving shaft 2 and a driven shaft 3 parallel thereto are mounted, by means of ball bearings 4, in a gear case 1. On the driving shaft 2, a conical pulley part 5 is mounted for rotation with but not axial displacement on the shaft, while a conical pulley part 6 is mounted for both rotation with and axial displacement on the shaft. On the driven shaft 3, a conical pulley part 7 is mounted for rotation with and axial displacement on the shaft, while a conical pulley part 8 is connected to the conical pulley part 7 for rotation therewith, but is not adapted for axial displacement. The conical pulley part 8 is supported on the shaft 3 by means of a thrust ball bearing 9, through a thrust ring 10. The conical pulley part 7 on the driven shaft 3 carries, on the face of its hub 11, curved tracks 12 which, with the aid of rolling bodies 13, cooperate with curved tracks 14 which are provided on the face of a collar 15 which is rigidly connected to the driven shaft 3. When torque is introduced into the driven shaft 3, it is transmitted, through the curved tracks 14, the rolling bodies 13, and the curved tracks 12, to the conical pulley part 7 which is mounted for rotation on the shaft 3, and to the conical pulley part 8 which is fixed for rotation therewith, and at the same time the torque is converted into an axial force acting in the direction of the arrow 16. This axial force grips the flexible transmission member 17, which connects the pairs of conical pulley parts 5, 6 and 7, 8, between the surfaces of the conical pulley parts 7 and 8 with such a force that the transmission member 17 is in a position to transmit the frictional forces corresponding to the particular load. Under the influence of the applied pressure acting in the direction of the arrow 16 on the driven side, the transmission member tends to assume a larger radius of travel between the conical pulley parts 7 and 8 and consequently the transmission member 17 tends to penetrate deeper between the conical pulley parts 5 and 6 on the driving side. As a result, an expansion force is produced on the driving side and tends to displace the movable conical pulley part 6 in the direction of the arrow 18. This expansion force is counteracted by an applied force which is produced as a result of the fact that, in a cylinder 19, which rotates with the driving shaft 2, an oil-pressure force acts on a power piston 21 which is axially displaceable in this cylinder 19 and rigidly connected to the hub 20 of the conical pulley part 6. This oil-pressure force is produced by a geared pump 22 which draws oil from the oil sump 23 of the transmission and delivers it through a pressure line 24, a longitudinal bore 25 in the driving shaft, and radial bores 26, to the cylinder 19. Also supplied with pressure oil through the pressure line 24 is a control cylinder 27 in which a control piston 28 is displaceable longitudinally. By means of its end face 29, which is constructed in the form of a controlling edge, the control piston determines, according to its axial position, the size of the cross-sectional area of an overflow aperture 30 through which the pressure oil delivered by the pump 22 can flow back into the gear case and hence to the oil sump 23. The control piston 28 is pivotally linked to a double-armed lever 31, one end 32 of which engages in a circumferential groove in the hub 20 of the axially displaceable conical pulley part 6 on the driving shaft 2, while its other end 33 is pivoted to a threaded member 34 which is adjustable in the axial direction by means of a threaded spindle 35 and an actuating hand-wheel 36.

The mode of operation of the transmission is as follows:

When the threaded member 34 is in the position illustrated, the infinitely variable transmission is deliberately set to a certain transmission ratio. It is assumed that the expansion force produced by the transmission member 17 in the direction of the arrow 18 is just balanced by the force of the oil pressure acting on the power piston, so that the movable pulley part 6 does not move in the axial direction on the driving shaft 2 and the set transmission ratio, that is to say the ratio of the radius of travel of the transmission member 17 in the pairs of conical pulley parts 5, 6 and 7, 8, is maintained. The correct force of oil pressure acting on the power piston 21 is produced as a result of the fact tht the control piston 28 exposes, with its control edge 29, just such a large cross-sectional area of the overflow aperture 30 that the pressure oil delivered by the pump 22 has precisely that pressure which is necessary to produce the axial force which balances the expansion force.

Now let it be assumed that a considerably higher output torque is suddenly taken off at the driven shaft 3 of the transmission. The consequence of this is that the pressure-applying device 12, 13, 14 applies a greater force in the direction of the arrow 16 as a result of which the expansion force acting in the direction of the arrow 18 on the driving side becomes greater than the counteracting force of the oil pressure acting on the piston 21. Accordingly, the movable pulley part 6 on the driving shaft 2 is displaced in the direction of the arrow 18. Through the lever 31, which is connected at 32 to the hub 20 of this conical pulley part 6 and which has its fixed fulcrum at 33 on the threaded member 34, the control piston 28 is also displaced, however, in the direction of the arrow 18, as a result of which the cross-sectional area of the overflow is reduced so that the pressure in the pressure line 24 and in the cylinder 19 immediately rises very sharply so that, after a very short displacement of the pulley part 6 in the direction of the arrow 18, the equilibrium between the increased expansion force and the oil-pressure force is restored. The rise in the oil pressure on axial displacement of the conical pulley 6 and hence of the control piston 28 is so sharp that the variation in the transmission ratio occurring as a result of the displacement of the conical pulley part 6 remains considerably less than in a transmission of a similar type in which the expansion force is taken up by levers or the like.

In order to vary the transmission ratio deliberately, the hand-wheel 36 is turned, as a result of which the threaded member 34 is displaced to the right or left. In the course of this, the lever 31 first pivots about its point of engagement 32 in the groove in hub 20 of the conical pulley part 6 and the control piston 28 accordingly alters its position in the control cylinder 27, as a result of which the cross-sectional area of the overflow 30 and hence the oil pressure acting on the power piston 21 is altered. Under the influence of the differential force which now arises between the expansion force on the one hand and the oil-pressure force on the other hand, the conical pulley part 6 is displaced in the axial direction until the control piston 28, which has likewise been displaced in the control cylinder 27 by its movement, has brought the cross-sectional area of the overflow 30 to such a size that the axial force prevailing under the new transmission ratio, which has appeared as a result of the axial displacement of the conical pulley part 6, comes into equilibrium with the oil-pressure force counteracting it.

Figure 2:
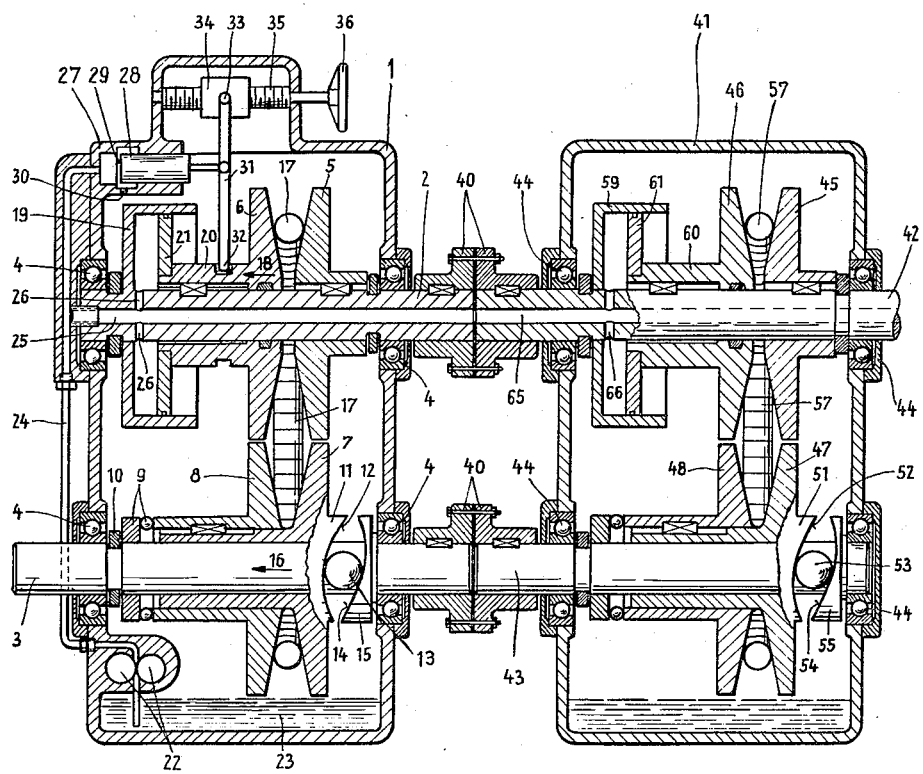
FIGURE 2 shows a longitudinal section, corresponding to FIGURE 1, through two infinitely variable transmissions connected in parallel.

FIGURE 2 shows a diagrammatic longitudinal section through two infinitely variable transmissions connected in parallel, the left-hand transmission being of exactly the same construction as the transmission described with reference to FIGURE 1, so that the same reference numerals are used for the individual parts. Connected to the driving shaft 2 and the driven shaft 3 of the first transmission, and fixed for rotation therewith, each by means of a connecting coupling 40, are the driving shaft 42 and the driven shaft 43 of a second transmission. The transmission connected in parallel is constructed in precisely the same manner as the transmission described with reference to FIGURE 1 except that it lacks the fluid pump 22, the pressure line 24, the control cylinder 27 with the control piston 28 displaceable therein, the lever 31 and the actuating member 34, 35, 36 for effecting a voluntary variation in the transmission ratio. Accordingly, in the transmission connected in parallel, the driving and driven shafts 42 and 43 respectively, which lie parallel to one another and which are connected for rotation with the shafts 2 and 3 of the first transmission, are mounted by means of ball bearings 44, in a case 41. The driving shaft 42 again carries a conical pulley part 45 which is connected to it for rotation therewith but not for axial displacement, and an axially displaceable conical pulley part 46, which rotates with it, while the driven shaft 43 carries a conical pulley 47 which is rotatable and axially displaceable thereon and on the hub of which is mounted the second conical pulley part 48 which is fixed for rotation but is not axially displaceable. The pressure-applying device 51, 52, 53, 54, 55 is constructed in the same manner as the pressure-applying device 11 to 15 in the first gear. Between the pairs of conical pulley parts 45, 46 and 47, 48 runs a transmission member 57. The hub 60 of the pulley part 46 carries a power piston 61 which is mounted for displacement in a cylinder 59 which rotates with the driving shaft 42. The driving shaft 42 comprises a longitudinal bore 65 which is connected to the longitudinal bore 25 in the driving shaft 2 of the first transmission. Pressure fluid is supplied to the rotating cylinder 59 through radial bores 66 leading from the longitudinal bore 65, so that the same pressure, which is determined by the setting of the control piston 28 in the first transmission, prevails in the rotating cylinders 19 and 59 of both gears.

The operation is as follows:

The transmissions connected in parallel are driven at the shaft 42 and are coupled to a machine or the like through the driven shaft 3. A certain transmission ratio has been deliberately set by means of the setting hand-wheel 36. The pressure of the pressure fluid in the rotating cylinders 19 and 59 accordingly has a given value. Accordingly, the same axial forces, which are in equilibrium with the expansion forces produced by the transmission members 17 and 57 on the driving sides of the gears connected in parallel, act on the power pistons 21 and 61. Because of the rigid coupling of their shafts 2 and 42, or 3 and 43, both transmissions must run at the same speed. Because of the equilibrium prevailing between the expansion forces and the oil-pressure forces, the total load is uniformly distributed between the two transmissions.

If the transmission connected in parallel, for example, were to transmit a higher proportion of the total load than the first transmission, then the expansion force produced by the transmission chain 57 would be greater than the axial counter force acting on the power piston 61. As a result, the axially movable pulley part 46 could be displaced so far that the expansion force produced by the transmission chain 57 would again balance the oil-pressure force acting on the piston 61.

Thus the equal loading of the two transmissions connected in parallel is restored.

The voluntary variation in the transmission ratio of both transmissions in the same sense is effected by actuating the setting hand-wheel 36. The process of setting to the new transmission ratio takes place in the same manner as described with reference to FIGURE 1 for the individual transmission, although in this case the transmission connected in parallel is also set at the same time because the variation in the oil-pressure force acts on both transmissions in the same manner.

The uniform load distribution between the transmissions connected in parallel and the restoration of this loading equilibrium after any disturbance has occurred therefore depends on the fact that the expansion forces which are dependent on the loading of the individual transmissions and which are produced by the transmission members 17 and 57, counteract a necessarily uniform oil-pressure force which is exerted on the power pistons 21 and 61 and must be in equilbrium therewith.

Naturally, it is possible to connect not only two transmissions in parallel—as illustrated in FIGURE 2. Instead, three or even more transmissions can be connected in parallel in the manner illustrated.

Figure 3:
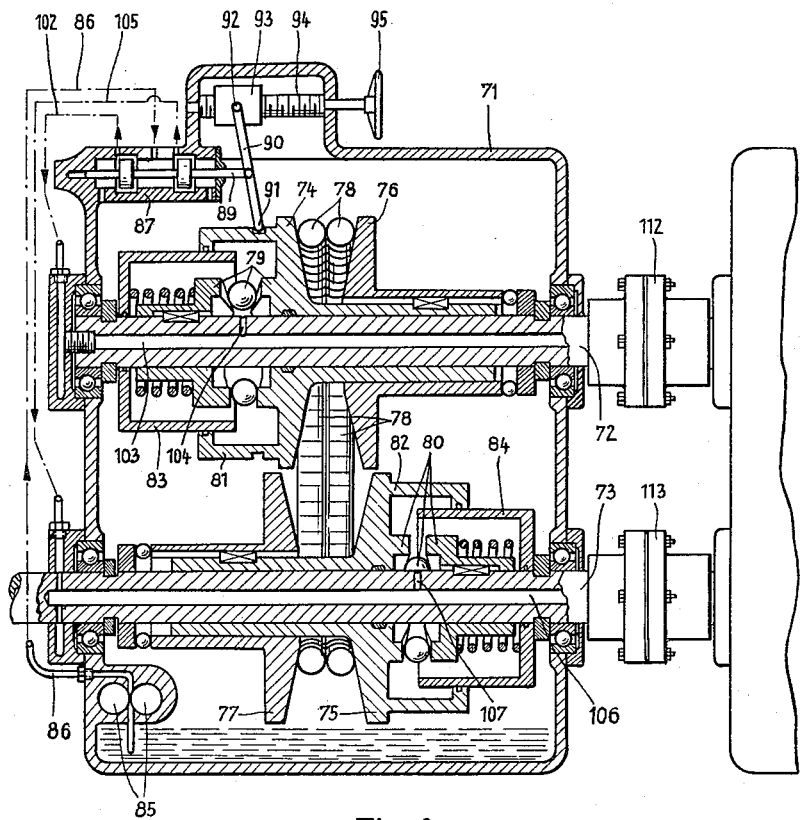
FIGURE 3 shows a longitudinal section through a modified embodiment of a transmission.

FIGURE 3 shows a transmission train with a control device according to the invention, which can operate on either of the two lines of shifting. For the sake of simplicity, only one of the two individual transmissions 71 is shown in section. Since either the shaft 72 or the shaft 73 may be the driving shaft, both sets of pulley parts are provided with a similar pressure-applying device to produce the axial forces necessary to transmit the frictional force. Despite the same construction of the pressure-applying devices, however, an expansion force which is greater than the axial force produced by the pressure-applying device appears at whichever is the driving side in such transmissions. The difference in these two forces is dependent on the particular transmission loading and an additional control force must be applied to the set of driving pulleys from outside.

Mounted on the two shafts 72 and 73, in a diagonally symmetrical arrangement, are conical pulley parts 74 and 75 respectively, each of which is movable axially and rotatable on the shaft, and pulley parts 76 and 77 respectively, each of which is fixed to the movable shaft for rotation therewith but is not axially displaceable. A transmission member 78 runs between the sets of pulley parts 74, 76 and 75, 77. Cooperating with each of the movable pulley parts 74 and 75 is a pressure-applying device 79 to 80 described with reference to FIGURE 1.

The movable conical pulley parts 74 and 75 are themselves constructed in the form of power pistons and each engages with a flange 81 or 82 from the outside over a cylinder 83 or 84 rotating with the shaft 72 or 73 respectively, the cylinders not being adapted for axial displacement on the shafts.

For the production of the load-responsive hydraulic control force on the driving side concerned, a geared pump 85 is provided which delivers pressure oil from the oil sump of the plant to a control cylinder 87 through a pipe 86. Mounted for longitudinal displacement in the control cylinder is a double piston 88 which is articulated, through its piston rod 89, to a double-armed lever 90, one end 91 of which engages in a peripheral groove in the hub of the axially movable conical pulley 74 and the other end 92 of which is pivoted to a threaded member 93 which is adjustable in the axial direction by means of a threaded spindle 94 and an actuating hand-wheel 95.

Figure 4:
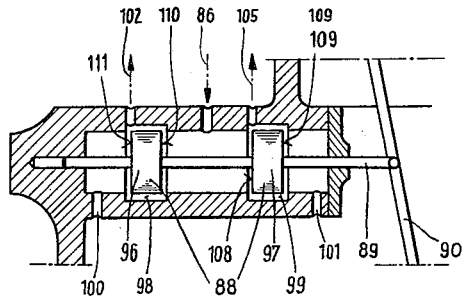
FIGURE 4 shows a longitudinal section through the control valve of the transmission of FIGURE 3, on a larger scale.

Spaced at the same distance apart as the two pistons 96 and 97 of the double piston 88, two annular grooves 98 and 99 are provided in the control cylinder 87, the width of each is somewhat greater than the width of the pistons 96 and 97. When the double piston is in the mid-position, the pressure oil introduced into the control cylinder 87 between the two pistons 96 and 97, through the pipe 86 can, as may be seen from FIGURE 4, flow through annular gaps in the annular grooves 98 and 99 and again through annular gaps in the adjacent portions of the control cylinder and from there through return bores 100 or 101 back into the oil sump. From the annular groove 98, a pipe 102 leads to the shaft 72 and through a longitudinal bore 103 and a radial bore 104 into the cylinder compartment 81, 83. From the annular groove 99, a pipe 105 leads to the shaft 73, through the axial bore 106 and radial bore 107 in which the pressure oil can flow into the cylinder compartment 82, 84.

The mode of operation of the control device is as follows: Assuming that the shaft 72 of the corresponding transmission is the driving shaft, then the hydraulic control force must be caused to act at the movable pulley 74. Under the influence of the load torque acting on the driven shaft 73, an expansion force, which displaces the pulley part 74 towards the left, appears at the driving side. As a result of this, the double piston 88 is displaced in the same direction. With its control edge 108, the piston 97 restricts the access of the pressure oil to the annular groove 99 and at the same time, with its control edge 109, it enlarges the outlet gap from the annular groove 99 so that any oil pressure present in the cylinder 82, 84 on the driven shaft 73 drops practically to zero. On the other hand, with its control edge 110, the control piston 96 enlarges the cross-section of the entrance for the pressure oil to the annular groove 98, at the same time reducing the size of the outlet cross-section for the pressure oil from the annular groove 98 by means of its control edge 111. As a result, an oil pressure develops in the pipe 102 and in the cylinder compartment 81, 83 on the driving side, which acts on the movable pulley part 74 constructed in the form of a power piston and so produces the necessary additional control force. When there is a rise in the torque loading at the driven shaft 73, the double piston 88 is displaced a short distance towards the left as a result of which the control force acting on the movable pulley part 74 is increased until there is again an equilibrium of forces.

In order to vary the transmission ratio deliberately, the threaded member 93 is displaced, for example towards the right, by means of the handwheel 95. As a result, the control force acting on the pulley part 74 is reduced so that the transmission can now assume a fresh transmission ratio by the pulley part 74 moving towards the left. At the same time, however, the control piston 96 is also moved towards the left so that the control force rises again until equilibrium is established between the expansion force and the control force at the new transmission ratio of the gear and under the fresh torque loading.

The same operations take place if the driving and driven shafts are interchanged. Only in this case, the pistons 96 and 97 likewise exchange their functions.

With the particular transmission just described, a similar transmission may be connected in parallel in the manner described with reference to FIGURE 2, for which purpose the shaft couplings 112 and 113 indicated in FIGURE 3 and corresponding to the shaft couplings 40 and 41 in FIGURE 2, are used. The transmission connected in parallel receives, through the axial bores 103 and 106, which continue in the shafts of this transmission, the same oil-pressure forces which are produced by the control device but, like the transmission connected in parallel as shown in FIGURE 2, it does not comprise a control cylinder or control piston or the actuating device for voluntarily varying the transmission ratio. Otherwise, the mode of operation of the transmission connected in parallel, particularly the even load distribution over all the participating transmissions, is precisely the same as the mode of operation described with reference to FIGURE 2.

The only prerequisite for the control device and the connecting of the transmissions in parallel according to the invention, is that the expansion forces which are exerted by the transmission members on the movable conical pulley parts on the driving side in question should be dependent on the particular loading of the transmission at the driven shaft, or the line of driven shafts. The means by which these load-responsive expansion forces are produced at the driving side are immaterial. The invention is therefore not restricted to the use of the pressure-applying device 11 to 15 (FIGURE 1) or 51 to 55 (FIGURE 2) or 79 to 80 (FIGURE 3), particularly as a number of solutions are already known for producing load and/or transmission-ratio responsive operating forces. Moreover, it is not necessary for only one transmission member to be provided between the pairs of conical pulleys in the transmission, as illustrated, and a plurality of transmission members connected in parallel may be provided in known manner between the pairs of conical pulley parts in each transmission. Nor would the scope of the present invention be exceeded, of course, if the constructional details of the transmission as illustrated were replaced by equivalents.

We claim:

1. In an infinitely variable transmission mechanism having parallel driving and driven shafts, a pair of conical pulley parts on each of the shafts, and a transmission member connecting said pulley parts, at least one pulley part of each pair being slidable along and rotatable with the shaft, a cylinder mounted on the driving shaft for rotation therewith, a piston rigid with the slidable pulley part on such shaft engaged with said cylinder, load-responsive means operatively connected to the slidable pulley part on the driven shaft to move said pulley part towards the other pulley part on the driven shaft as the load increases, a source of fluid under pressure, a line connecting said source to said cylinder, and means operatively associated with said line operatively connected to one of said slidable pulleys and controlled thereby to regulate the supply of fluid to said cylinder for automatically restoring a predetermined transmission ratio between the shafts upon deviation therefrom, and manual means operatively connected to said regulating means for varying the transmission ratio.

2. In a transmission mechanism as claimed in claim 1, said regulating means comprising a control cylinder and a control piston slidable therein, the interior of the control cylinder being connected to said line, said control cylinder having an outlet port in the wall thereof, said control piston having an edge which controls the open area of said port, a double armed lever having a pivotally linked connection from a point thereof to said control piston, means pivotally connecting a second point of said lever to said slidable pulley part, a manually adjustable element, and means connecting a third point of said lever to said adjustable element.

3. In an infinitely variable transmission mechanism having parallel shafts, a pair of conical pulley parts on each of the shafts, and a transmission member connecting said pulley parts, at least one pulley part of each pair being slidable along and rotatable with the shaft, load responsive means operatively connected to the slidable pulley parts on each of the shafts to move the pulley part on the shaft which is being driven to move such pulley part towards the other pulley part on said shaft as the load increases, a cylinder mounted on each of the shafts for rotation therewith but fixed against axial movement therealong, a piston rigid with the slidable pulley part on each shaft and engaged with the cylinder thereof, a source of fluid under pressure, a control cylinder, a line connecting said source with the central part of said control cylinder, said control cylinder having control outlets on either side of the center one connected to each of said cylinders, a control valve slidable in said control cylinder and having two piston portions for covering and uncovering said control outlets, means operatively connected to one of said slidable pulley parts and to said valve for moving said valve so as to restore the transmission ratio to a constant value upon deviation therefrom, and manual means operatively connected to said valve for moving the valve to vary the transmission ratio.

4. A multiple infinitely variable transmission comprising a plurality of transmission mechanisms each having parallel shafts, a pair of conical pulley parts on each of the shafts, and a transmission member connecting said pulley parts, at least one pulley part of each pair being slidable along and rotatable with the shaft, means connecting one shaft of each mechanism with a corresponding shaft of the other mechanism for rotation therewith, cylinders rigid with the corresponding shafts of each transmission mechanism, pistons rigid with the slidable pulley parts on such shafts engaged with said pistons, load responsive means operatively connected with slidable pulley parts on the other corresponding shafts of each of said mechanisms to move said pulleys towards the other pulley parts as the load on such shafts increases, a source of fluid under pressure, a line connecting said source to said cylinders, and means operatively associated with said line operatively connected to one of said slidable pulley parts and controlled thereby to regulate the supply of fluid to said cylinders for automatically restoring a predetermined transmission ratio between the shafts upon deviation therefrom, and manual means operatively connected to said regulating means for varying the transmission ratio.

5. In a transmission mechanism as claimed in claim 4, said regulating means comprising a control cylinder and a control piston slidable therein, the interior of the control cylinder being connected to said line, said control cylinder having an outlet port in the wall thereof, said control piston having an edge which controls the open area of said port, a double armed lever having a pivotally linked connection from a point thereof to said control piston, means pivotally connecting a second point of said lever to said slidable pulley part, a manually adjustable element, and means connecting a third point of said lever to said adjustable element.

References Cited in the file of this patent
FOREIGN PATENTS

| | | |
|---|---|---|
| 1,146,756 | France | May 27, 1957 |
| 219,574 | Australia | Jan. 9, 1959 |